Sept. 24, 1935.  W. D. SCHMIDT  2,015,439

LOADING APPARATUS FOR CHUCKS

Original Filed May 31, 1929

Inventor
William D. Schmidt.
By Geo. H. Kennedy Jr.
Attorney

Patented Sept. 24, 1935

2,015,439

UNITED STATES PATENT OFFICE 2,015,439

LOADING APPARATUS FOR CHUCKS

William D. Schmidt, Worcester, Mass., assignor to The Heald Machine Company, Worcester, Mass., a corporation of Massachusetts Original application May 31, 1929, Serial No. 367,449, now Patent 1,915,005, dated June 20, 1933. Divided and this application October 4, 1932, Serial No. 636,196

5 Claims. (Cl. 29—88.2)

The present application is a division of my prior application Serial No. 367,449, filed May 31, 1929, now Patent No. 1,915,005, dated June 20, 1933.

The invention relates to loading apparatus for chucks and particularly concerns apparatus for easily and quickly placing a great number of annular workpieces such as piston rings in concentric relation in a single chuck.

In order to hold the several piston rings, whose internal surfaces are to be ground or otherwise machined, in concentric relation, the chuck provides a hollow cylinder, and work clamping fingers to press the workpieces into engagement with an end flange provided by the cylinder. It would be very difficult to load a chuck of this nature manually since the clearance between the cylinder of the chuck and the piston rings must be very small if the workpieces are to be accurately centered and since it would be difficult to insert the individual rings without causing them to bind owing to their narrowness.

The principal object of the present invention, therefore, resides in the provision of a loading or transferring member adapted to hold a great plurality of piston rings in alined position, permitting all of them to be positioned within the cylindrical holding means of the chuck at one time.

Since much difficulty would be experienced in manually loading the transferring member above mentioned, the invention further provides a device in which the large number of piston rings are easily positioned in alined relation by hand and this device is used for loading the workpieces on the transferring member. Thus the invention provides primary and secondary loading apparatus by which workpieces are positioned in a chuck. Other and further objects and advantages of the invention will be made apparent in the following detailed description thereof, reference being had to the accompanying illustrative drawing, in which—

Like reference characters refer to like parts in the different figures.

Figure 4:
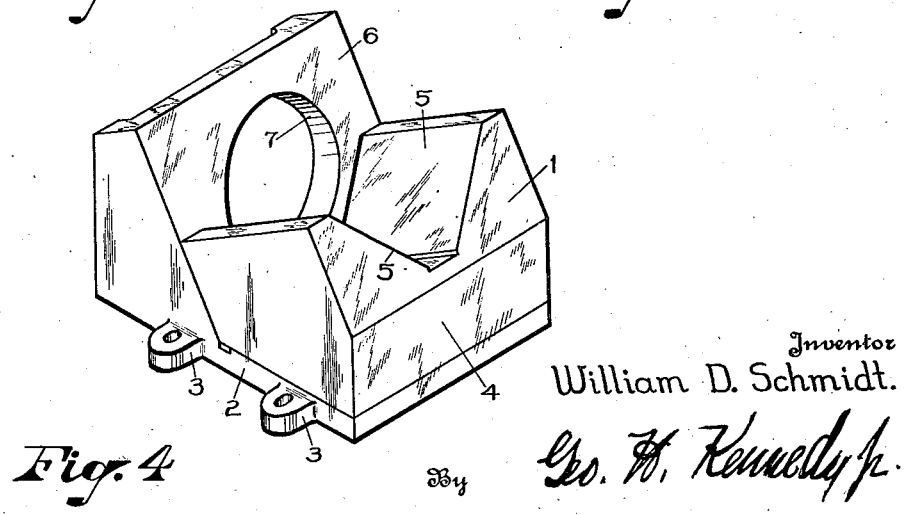
Fig. 4 is an isometric view of the primary work loader.

Referring first to Fig. 4, a primary work loader 1 is shown into which a plurality of workpieces of the type adapted to be handled by the apparatus of this invention, for example, piston rings, may be readily loaded by hand without waste of time or effort. The loader 1 comprises a base portion 2 having lugs 3 by which it may be fastened to a bench or other suitable place, said base portion supporting a member 4 having side portions 5 forming a dihedral angle. The vertex of the dihedral angle (which, in this case, is not structurally defined, as is apparent from the drawing) is inclined somewhat from the horizontal in order that the piston rings, when positioned within said angle, may be urged by gravity toward one end of the angle. The lower end of the dihedral angle formed by the sides 5 is closed by an end plate 6 which may be formed integrally with the base 2 as shown, and in which there is a large circular orifice 7, the function of which will hereinafter appear.

The piston rings are easily picked up in considerable quantities and placed on the work loader with their peripheries tangent to the planes of the faces 5 of the dihedral angle and there will rest one against another with the lowermost ring resting against the end plate 6, said ring being larger than the orifice 7. With the piston rings positioned in this manner, the axes of all the piston rings will coincide.

Figure 1:
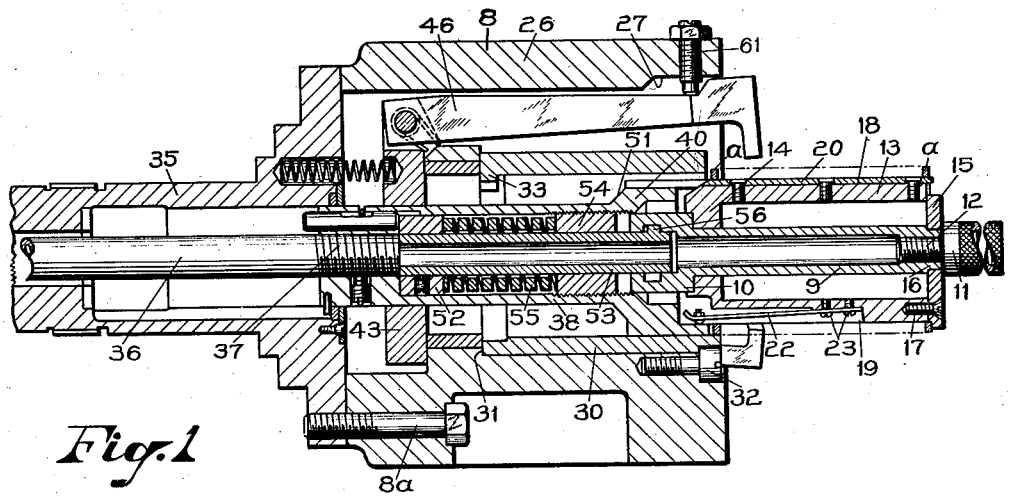
Fig. 1 is a sectional view of a chuck showing the transferring member attached to the draw rod and about to be drawn into the chuck.
Figure 3:
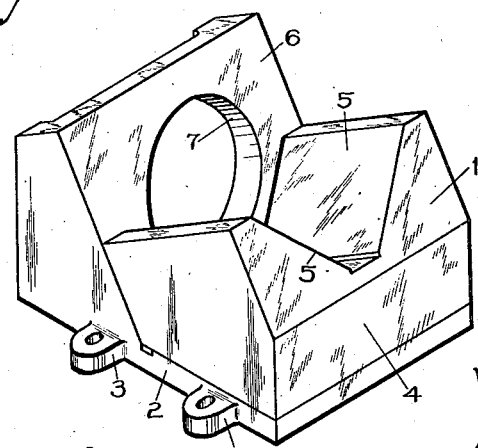
Fig. 3 is a rear elevation of the transferring member.
Figure 2:
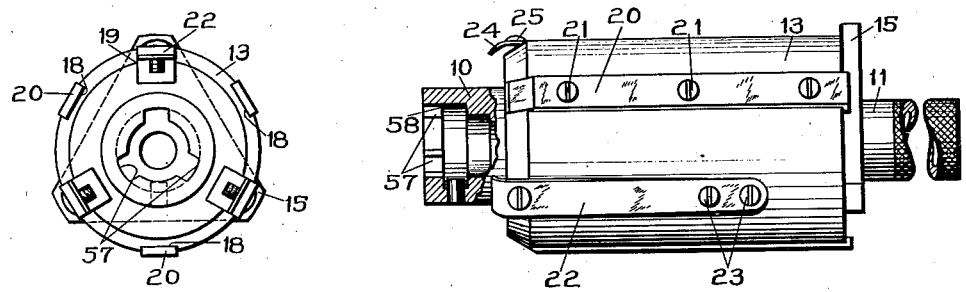
Fig. 2 is a side elevation of the transferring member with a portion thereof shown in section.

The secondary loading device or the transferring member which is used to transfer the piston rings from the primary loader 1 into the chuck 8 is illustrated in Figs. 1, 2 and 3. As shown, a rod or tube 9 is provided having an enlarged portion 10 at one end and a handle 11 attached by a screw threaded portion 12 to the other end. A hollow cylindrical member 13 is fastened to the rod 9 and is held firmly in position by the engagement of a flange 14 formed at one end of the cylinder 13 with the shoulder formed by the end of the enlarged portion 10. At the other end of the cylinder, said rod and cylinder are not in engagement but are held in rigid relation by a triangular end plate 15 which provides a central bore fitting on a reduced portion 16 of the rod 9 and which is fastened by screws 17 to the cylindrical member 13. The front portion of the handle 11 forms a shoulder to hold the plate 15 firmly in position.

The external surface of the cylindrical member 13 provides a plurality of circumferentially spaced slots 18 of uniform depth and a plurality of somewhat irregular slots 19 also circumferentially spaced, the several slots 18 and 19 being alternately arranged. Hardened steel bearing pieces 20 are positioned in the slots 18 and are held therein by screws 21 and a flat spring 22 is secured to the bottom or right hand end of each of the slots 19, a pair of screws 23 for each spring supporting the latter in position. As best shown in Fig. 1, each spring 22 normally tends to lie in a line which is inclined with respect to the axis of the cylinder 13 with the left hand end of each spring further from said axis than the right hand end thereof. The extreme left hand end of each spring is curved inwardly as at 24 and round headed studs 25 are provided on the ends of the spring for a purpose which will hereinafter appear.

It will be apparent that the secondary loading device can be held in one hand by the handle 11 and that, if it is of suitable diameter, it can be readily pushed into a stack of rings held in the loading device 1. The turned-over ends of the springs 22 will readily cause the springs to flex inwardly and permit the device to be pushed into the rings. Portions of the end plate 15 which extend beyond the ends of the cylinder 13 form an end stop to hold the first piston ring while the thrust of the secondary loading device is taken by the back plate 6 of the device 1, the orifice 7 receiving the front end of the transfer device if the device is pushed entirely through the rings. The round headed studs 25 serve to flex the springs 22 inwardly as said studs pass into the piston rings and when the transferring member is loaded with rings, the flat springs and the studs 25 thereon prevent said rings from falling off of said member as they are transferred to the chuck 8.

Referring now to Fig. 1, the chuck 8, which is more fully described in applicant's Patent No. 1,915,005 above cited, comprises a body portion 26 of generally hollow cylindrical form having radial slots 27 in its internal cylindrical surface, which latter, between the slots 27, serves for the support of a hollow cylindrical sleeve 30, the inner end of which abuts against a shoulder 31 provided by the body of the chuck, said sleeve being held in place by screws 32. Segmental end flanges 33 are provided at the inner end of the cylindrical sleeve to form an end stop for supporting the workpieces, the latter being positioned in engagement with the internal cylindrical surface of said sleeve 30.

The body of the chuck 8 is fastened by bolts 8a to the end of the spindle 35 which supports the chuck, said spindle being rotatably mounted in the usual manner. The spindle 35 is hollow and has mounted therein a draw rod 36 to operate the work clamping means of the chuck. The end of said draw rod is screw threaded as at 37 and engages a generally tubular member or sleeve 38 which serves, as pointed out in the above noted application, for ejecting the workpieces and also for actuating the work clamping fingers of the chuck.

Inside the sleeve 38 is slidably mounted a collar 52 which is attached to a rod 53, the latter passing through a stationary collar 54 which is in screw threaded engagement with the inside of the sleeve 38; and between the collar 52 and 54 is located a heavy coil spring 55. The forward end of the rod 53 is provided with a plurality of lugs 56.

The enlarged portion 10 of the transfer device provides a plurality of slots 57 equal in number to the lugs 56, of the same width and depth, and spaced in the same angular relation to each other as the said lugs are spaced and beyond said slots 57 is an annular groove 58. With the parts of the chuck in the position of Fig. 1, the portion 10 of the transfer device may readily be placed on the end of the rod 53, the lugs 56 passing through the slots 57 into the annular portion 58 whereupon a slight turning of the transfer device will result in locking of said device to the rod 53.

With the transfer device attached to the rod 53, it is apparent that, when the draw rod 36 is actuated to the left, the transfer device with the workpieces thereon will be drawn into the hollow cylindrical sleeve 30, and the workpieces a are then held in exact alined relation by the internal surface of said sleeve 30. When the transfer device is drawn partly into the cylindrical sleeve 30, a shoulder 51 on an enlarged portion 40 of the member 38 strikes a member 43 within the chuck and urges this member to the left carrying the chuck fingers 46 to the left therewith and accordingly urging the right hand ends of said fingers radially inward by engagement of said fingers with adjustable screws 61 mounted in the cylindrical portion 26 of the chuck. As the transfer device is drawn completely into the chuck, the clamping fingers 46 are moved into engagement with the outer surface of the outermost ring on the transfer device, thereby clamping said ring securely in the chuck against the shoulder 33. The transfer device may then be turned to relieve the locking device, consisting of the lugs 56 and the grooves 58, and said transferrer may then be manually removed from the machine leaving the workpieces in position in the chuck with the axes of all said workpieces in alined relation.

From the foregoing, it will be apparent that the primary work loader provides for alining a large number of workpieces so that the axes thereof shall all be concentric, and the transfer device or secondary work loader is inserted within the bores of said alined workpieces to impale said workpieces thereon and support said workpieces in alined relation. Said transfer device is then connected to the draw rod of the chuck and is drawn into said chuck with the workpieces mounted thereon for positioning said workpieces in alined relation within the cylindrical member 30 of the chuck where said workpieces are positively clamped in alined relation. The transfer device is then withdrawn from the chuck in order to permit a grinding operation to take place on the internal surfaces of workpieces.

I claim,

1. In apparatus of the class described, a transferrer device comprising a generally cylindrical member, flat springs located in depressions in said member, a connecting device at one end of said member, whereby said transferrer may resiliently hold a plurality of annular workpieces in accurate alinement and be connected to a member in a chuck and a handle at the opposite end of said member.

2. In apparatus of the class described, a transferring device comprising a generally cylindrical member, a plurality of flat springs located in depressions in the cylindrical surface, attaching means at one end of said member, a handle at the other end of said member, whereby said transferring device may resiliently hold a plurality of workpieces in accurate alinement and be lifted by the handle to a chuck and connected to a member therein, and an end stop at the same end of the cylinder as the handle to prevent axial movement of said workpieces on said member.

3. In apparatus of the class described, a transferring device comprising a generally cylindrical member, a plurality of flat springs located in depressions in the cylindrical surface, and round headed studs carried on the ends of the flat springs, whereby the transferring device may be readily pushed into a plurality of annular workpieces in order to place them in a chuck.

4. In apparatus of the class described, a transferring device comprising a generally cylindrical member, an end stop on one end of said member, a handle on the same end of said member, a plurality of wear plates in the cylindrical surface, a plurality of flat springs located in depressions in the cylindrical surface, round headed studs on the ends of the flat springs, and attaching means opposite the handle, whereby the transferring device may support a plurality of annular workpieces which are resiliently held by the flat springs and be connected to a member in a chuck.

5. In apparatus of the class described, a transferring device comprising a shaft, a hollow cylinder having an inwardly extended flange in engagement with said shaft, a handle at the other end of the shaft, a disc attached to the open end of the cylinder and held to the shaft by the handle, wear plates in the cylindrical surface of the device, and means for resiliently holding a plurality of annular workpieces on the surface of said cylinder to transfer them to a chuck.

WILLIAM D. SCHMIDT.